United States Patent Office 3,277,748
Patented Oct. 11, 1966

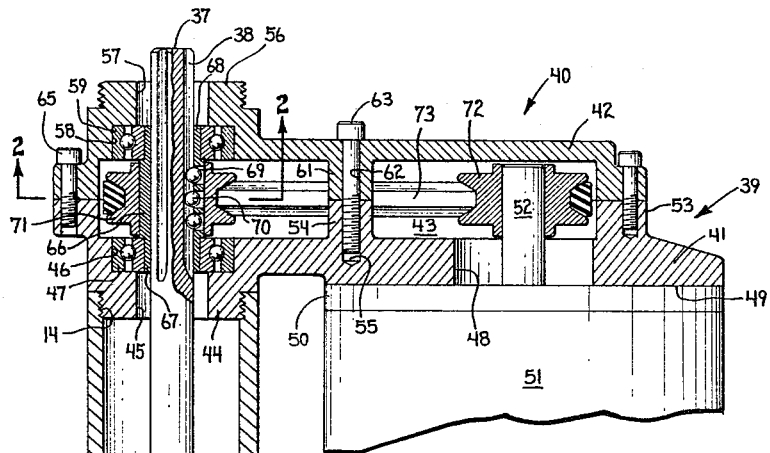

3,277,748
SELF-CONTAINED DRILL ASSEMBLY
Robert L. Bechtol, Wabash, Ind., assignor, by mesne assignments, to Diehl Machines, Inc.
Filed Sept. 23, 1964, Ser. No. 398,560
3 Claims. (Cl. 77—5)

The present invention relates to a self-contained drill assembly and to a power transfer unit forming a part of such an assembly. The primary object of the invention is to provide unusual flexibility and facility in the use of such an assembly, particularly adapting the same for use in crowded or relatively inaccessible environments.

Further objects of the invention will appear as the description proceeds.

To the accomplishment of the above and related objects, the invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a vertical section through an assembly constructed in accordance with the present invention;

FIG. 2 is a fragmentary horizontal section taken on the line 2—2 of FIG. 1, looking in the direction of the arrows and drawn to a slightly enlarged scale;

FIG. 3 is a reduced, fragmentary elevation of the upper portion of the assembly illustrated in FIG. 1, showing the transfer unit arranged in inverted position; and FIG. 4 is a fragmentary section similar to the upper portion of FIG. 1 but showing a modified form of transfer means.

The invention is primarily concerned with a drill or similar tool which includes a housing adapted to be mounted in any desired position relative to the work by means of a clamp (not shown) and which shall include, as a self-contained unit, power means for rotating the tool and fluid-actuating means for advancing and retracting the tool during its rotation. In many industrial applications, it is desirable to mount a plurality of such assemblies in relatively close and crowded array so that, for instance, a large number of holes may be simultaneously drilled, in a predetermined relationship, in a single work piece, and the operation may be uniformly repeated upon successive work pieces brought to the drill stand, more or less in the manner suggested in, for instance, the patent to Ralston 2,289,855 issued July 14, 1942. That patent discloses hydraulic means for rotating each drill and hydraulic means for advancing and retracting each drill; and it will be obvious that there are serious disadvantages in such a machine, including the problem of handling multiple hydraulic lines to each unit.

According to the present invention, each unit or assembly includes an electric motor for rotating the drill or similar tool, pneumatic means for advancing the tool and spring means for retracting the tool. The electric motor of each assembly is offset from the axis of the drill; and, in order to facilitate arrangement of a plurality of such assemblies in close array, I provide means whereby the motor may be readily selectively arranged either alongside the drill housing or in a position axially displaced from the drill housing.

Referring more particularly to the drawings, it will be seen that I have illustrated a tubular housing indicated generally by the reference numeral 10. For convenience of assembly of the parts to be described, I prefer to form the housing 10 from two or more separable tubes 11 and 12 coaxially joined by any suitable means such as the threaded joint 13. In the embodiment of the invention illustrated, the open upper end of the tube 11 is internally threaded as at 14, and the open lower end of the tube 12 is internally threaded as at 15. A guide spud 16 is preferably received in the lower end of the tube 12, as shown.

A sealing partition 17 is received in the housing 10 and preferably said partition may be provided with a peripheral flange 18 which is clamped between the elements of the joint 13, as shown. Any suitable packing means may be provided for the bore of the partition 17; but I have shown said bore formed with a reentrant groove 19 in which is received an O-ring 20.

Reciprocably received in the housing 10 below the seal 17 is a piston 21 formed with an axial bore 22 provided at its lower end with an enlargement 23 in which is received anti-friction bearing means 24; and the lower end 25 of a spindle 26 is journalled in said bearing means 24.

The piston 21 is provided with a reduced, upward extension 27 which reciprocably penetrates the bore of the seal 17 and, at its upper end, carries an abutment 28. As shown, the abutment 28 is threadedly mounted on the piston extension 27.

The abutment 28 is snugly slidably received in the tube 11 and is formed to provide an upwardly opening cup 29 in which is mounted anti-friction bearing means 30 in which the spindle 26 is also journalled. Any suitable means is provided to retain the spindle 26 against axial movement relative to the piston 21 and abutment 28. As shown, the lower end 25 of the spindle is enlarged to provide a shoulder bearing upon the bearing means 24 to retain the spindle against upward movement relative to the piston; and at a point immediately above the abutment 28, the piston is formed with peripheral groove 31 receiving a snap ring 32 bearing upon the upper end of the bearing means 30 to retain the spindle against downward movement relative to the abutment 28. A coiled spring 33 is sleeved about the extension 27 and is confined between the seal 17 and the abutment 28 to hold the piston and spindle assembly yieldably in its uppermost position as illustrated.

Immediately below the seal 17, the tube 12 is formed with a port 34 in which is mounted the outlet 35 from control valve means 36 of any suitable character to control the flow of air under pressure from any suitable source (not shown) to the interior of the tube 12 and exhaust of air therefrom. It will be seen that the piston 21 is so designed as not to interfere with air flow through the port 34.

It will be obvious that, when air under pressure is admitted to the tube 12 through the pipe 35, the piston 21 will be driven downwardly against the resilient resistance of the spring 33; and that when air is exhausted from the housing, the spring 33, acting between the stationary seal 17 and the movable abutment 28, will return the piston to its illustrated position. Obviously, the spindle 26 will partake of all axial movements of the piston 21 and abutment 28.

As is clearly illustrated, the upper end portion 37 of the spindle 26 extends significantly beyond the upper end of the housing 10. This outwardly extending portion 37 of the spindle is formed with one or more longitudinally-extending spline grooves 38. In the illustrated embodiment of the invention, three such grooves are uniformly spaced about the surface of the spindle region.

A power transfer unit is indicated generally by the reference numeral 39. Such unit comprises a casing indicated generally at 40 and consisting of a first casing section 41 and a second casing section 42, said casing sections being designed for mating assembly to define a chamber 43.

Near one of its ends, the casing section 41 is formed with a reduced, externally threaded neck 44 proportioned and designed for selective connection to the housing 10 through the threaded end 14 thereof. A port 45 concentric with said neck 44 opens into the chamber 43 and, at its inner end, is formed to define a socket 46 in which is received an anti-friction bearing 47. Near its opposite end, the casing section 41 is formed with a second port 48 opening from the chamber 43 through a table or base surface 49 designed for the reception and connection of the end flange 50 of a conventional preferably reversible electric motor 51, the port 48 being so located that, when the motor flange 50 is so connected and seated upon the table 49, the shaft 52 of said motor will extend through said port 48 into the chamber 43. The surface of the casing section 41 opposite the table 49 is formed to provide a perimetral flange 53; and preferably a post 54, approximately midway between the ends of the casing section 41, extends into the plane of the distal surface of the flange 53, said post being formed with a threaded socket 55.

The casing section 42 is provided with a neck 56 in all respects similar to the neck 44 and disposed at the corresponding end of the casing 40. A port 57 concentric with the neck 56 opens into the chamber 43 and at its inner end is formed to provide a socket 58 in which is received an anti-friction bearing 59. As is clearly shown, when the casing sections 41 and 42 are assembled, the bearings 47 and 59 are disposed in coaxial, axially spaced relation. The section 42 is formed to provide a perimetral flange 60 adapted to mate with the flange 53 of the section 41, and is provided further with a post 61 adapted to mate with the post 54 and formed with a bore 62 therethrough, registrable with the socket 55. A screw 63 may penetrate the bore 62 and enter the threaded socket 55 to secure the casing parts in mated relation, and additional screws 64 and 65 are preferably provided for the same purpose.

A sleeve 66 having reduced opposite end portions 67 and 68 is supported between the bearings 47 and 59. As is clearly illustrated, said reduced end portions are received respectively in said bearings, whereby said sleeve is confined against axial movement within the chamber 43, but is free to rotate about its longitudinal axis. Within its median region, the sleeve 66 is formed with one or more substantially radially inwardly opening sockets 69. If the spindle 26 is formed with more than one spline groove 38, the sleeve 66 will be provided with at least one socket 69 for each such groove, said sockets being so peripherally spaced that, when said sleeve telescopically embraces the spindle 26, the respective sleeve sockets will register with the respective spline grooves of the spindle. As shown, and preferably, the sleeve 66 will be formed with three axially-aligned sockets 69 for each spline groove 38; and a ball or other roller means 70 is received in each such socket, projecting radially inwardly beyond the internal diameter of said sleeve. Preferably, each socket will be slightly reduced in diameter at its radially inner end to retain said balls against radially inward escape from their sockets at times when the spindle 26 is not positioned within the sleeve.

As will be apparent from inspection of FIGS. 1 and 2, when the tubular housing 10 is assembled with the neck 44 of the transfer unit 39, the balls 70 enter the spindle grooves 38 to provide a rotational driving connection between the sleeve 66 and the spindle 26 which connection, however, freely permits relative axial movement between the spindle 26 and the sleeve 66.

A rotor 71 is mounted on the median portion of the sleeve 66 and is rotationally secured thereto by any suitable means (not shown), said rotor being axially confined between the bearings 47 and 59. A similar rotor 72 is rotationally fixedly mounted on the motor shaft 52; and means 73 provides a driving connection between the rotors 72 and 71. As illustrated in FIGS. 1 and 2, the rotors 71 and 72 are V-pulleys and the means 73 is a V-belt trained over the pulleys; but it will be obvious that the rotors 71 and 72 could be sprockets drivingly connected by a chain.

From the above description of structure, it will be apparent that when the parts are arranged in the relationship illustrated in FIG. 1, energization of the motor 51 will rotate a drill bit 74, for instance, received in a suitable chuck 75 carried at the lower end of the spindle 26. The entire assembly being mounted, in a suitable attitude relative to a work piece, when the valve 36 is operated to admit fluid under pressure to the upper end of the chamber within the tube 12, the piston 21 will be moved downwardly, carrying with it the spindle 26, to advance the bit 74. It will be apparent that the balls 70, riding in the grooves 38 as the spindle 26 so moves downwardly, will maintain the driving connection between the pulley 71 and the spindle. After the bit has been advanced to a desired degree, the valve 36 will be actuated, preferably by conventional automatic control means (not shown) to cut off the flow of pressure fluid to the tube 12 and to exhaust the space between the piston 21 and the seal 17. Thereby, the spring 33 will be permitted to return the piston 21, thus retracting the spindle 26 and bit 74 to their illustrated positions, still without disturbing the driving connection between the rotor 71 and the spindle 26.

If it is desired to rearrage the position of the motor 51 to the relationship illustrated in FIG. 3, the tubular housing 10 may be disconnected from the transfer unit 39 by merely separating said housing from said unit at the threaded joint 14. It will be apparent that, as that separation is made, the piston 26 will move with the housing 10 while the sleeve 66 and its associated parts will move with the casing 40. Thus, the balls 70 will be withdrawn through the open upper ends of the grooves 38.

Now, the unit 39 may be inverted and reassembled with the housing 10 by engaging the threads 14 of the housing with the threaded neck 56 of the casing section 42, the sleeve 66 slipping readily onto the upper end portion 37 of the spindle 26 with its end 68 below its end 67, while the balls 70 reenter the spline grooves 38. By means of this simple manipulation, the driving connection between the motor shaft 52 and the spindle 26 is thus reestablished with the motor 51 displaced above the upper end of the housing 10, in the manner suggested in FIG. 3. Such inversion will, of course, reverse the direction in which the belt 73 will be driven, and it is for that reason that the motor 51 is preferably a reversible motor.

In FIG. 4, I have illustrated a modified power transfer unit 80 in which a gear 81 is substituted for the pulley 71 and a gear 82 is substituted for the pulley 72. In this form of the invention, the posts 54 and 61 are replaced by short spuds 83 and 84 to accommodate therebetween a bushing 86 sleeved on the screw 85; and a gear 87 is mounted on said bushing, meshing with the gears 81 and 82 to establish a driving connection therebetween. In all other respects, the assembly of FIG. 4 is identical with that of FIG. 1 and will operate in precisely the same manner.

I claim as my invention:

1. A self-contained drill assembly comprising a tubular housing open at both ends, an axially-perforated seal positioned in said housing, a piston axially reciprocably received in said housing between said seal and one open end of said housing, a spindle axially fixed relative to said piston but rotatable relative thereto about the axis of said piston, said spindle penetrating said seal and extending beyond the other open end of said housing, means for admitting fluid under pressure to said housing between said seal and said piston, and means for rotatably driving said spindle comprising a transfer case including a first section and a second section mating with said first section to define a chamber, means adjacent one end of said first section cooperatively engageable with said housing to secure said case to said other end of said housing, first bearing means carried by said first section adjacent said last-named means coaxial with said housing and supporting said spindle for reciprocation relative thereto, means adjacent the corresponding end of said second section and alternatively cooperatively engageable with said housing to secure said casing in inverted position to said housing, second bearing means carried by said second section adjacent said last-named means coaxial with said housing and supporting said spindle for reciprocation relative thereto, said first section being formed with a port adjacent its other end, a motor having a shaft, means securing said motor to said first section with its shaft entering said chamber through said port, an element within said chamber rotationally fixed with respect to said spindle, said spindle being axially reciprocable relative to said element, and means within said chamber providing a driving connection between said shaft and said element.

2. The drill assembly of claim 1 in which said element is an annular rotor, the region of said spindle which extends beyond said other end of said housing being formed with an axially elongated spline groove opening through the adjacent end of said spindle, a sleeve embracing the splined region of said spindle and journalled in and axially fixedly positioned between said first and second bearing means, said sleeve being formed with an inwardly-opening radial socket therein, roller means positioned in said socket and entering said spline groove to fix said sleeve rotationally to said spindle while permitting relative axial movement therebetween, said rotor embracing said sleeve, and means providing a driving connection between said rotor and said sleeve.

3. A transfer assembly for transmitting power between a shaft and a spindle comprising a first casing section and a second casing section mating to define a chamber, a rotor within said chamber adjacent one end thereof and adapted to be drivingly mounted on such a shaft, each of said sections, at a point remote from said one chamber end, supporting bearing means, said bearing means being disposed in axially-spaced relation on a common axis substantially parallel with the axis of said rotor, a sleeve journalled at its opposite ends in said bearing means, respectively and held against axial movement relative thereto, said sleeve being adapted to be telescopically mounted on such a spindle and being provided with an inwardly-opening, substantially radial socket, roller means disposed in said socket and protruding radially inwardly therefrom, and a second rotor drivingly fixed to said sleeve and drivingly connected to said first rotor, each of said casing sections being exteriorly provided with connector means concentric with said bearing means, and said connector means respectively being substantially identical.

No references cited.

FRANCIS S. HUSAR, *Primary Examiner.*